Sept. 29, 1953  C. C. LEATHERMAN ET AL  2,653,665
STATISTICAL CARD PUNCH AND VERIFIER
Filed Jan. 31, 1950  8 Sheets-Sheet 1

INVENTORS.
William Weckenfuss
and
Clifford C. Leatherman
BY
Edward L. Mueller
ATTORNEY.

Sept. 29, 1953   C. C. LEATHERMAN ET AL   2,653,665
STATISTICAL CARD PUNCH AND VERIFIER
Filed Jan. 31, 1950   8 Sheets-Sheet 2

INVENTORS.
William Wockenfuss and
Clifford C. Leatherman,
BY
Edward L. Mueller
ATTORNEY.

Sept. 29, 1953　　C. C. LEATHERMAN ET AL　　2,653,665
STATISTICAL CARD PUNCH AND VERIFIER Filed Jan. 31, 1950　　8 Sheets-Sheet 3

INVENTORS.
William Wockenfuss and
Clifford C. Leatherman,
BY

ATTORNEY.

Sept. 29, 1953   C. C. LEATHERMAN ET AL   2,653,665
STATISTICAL CARD PUNCH AND VERIFIER
Filed Jan. 31, 1950   8 Sheets-Sheet 4
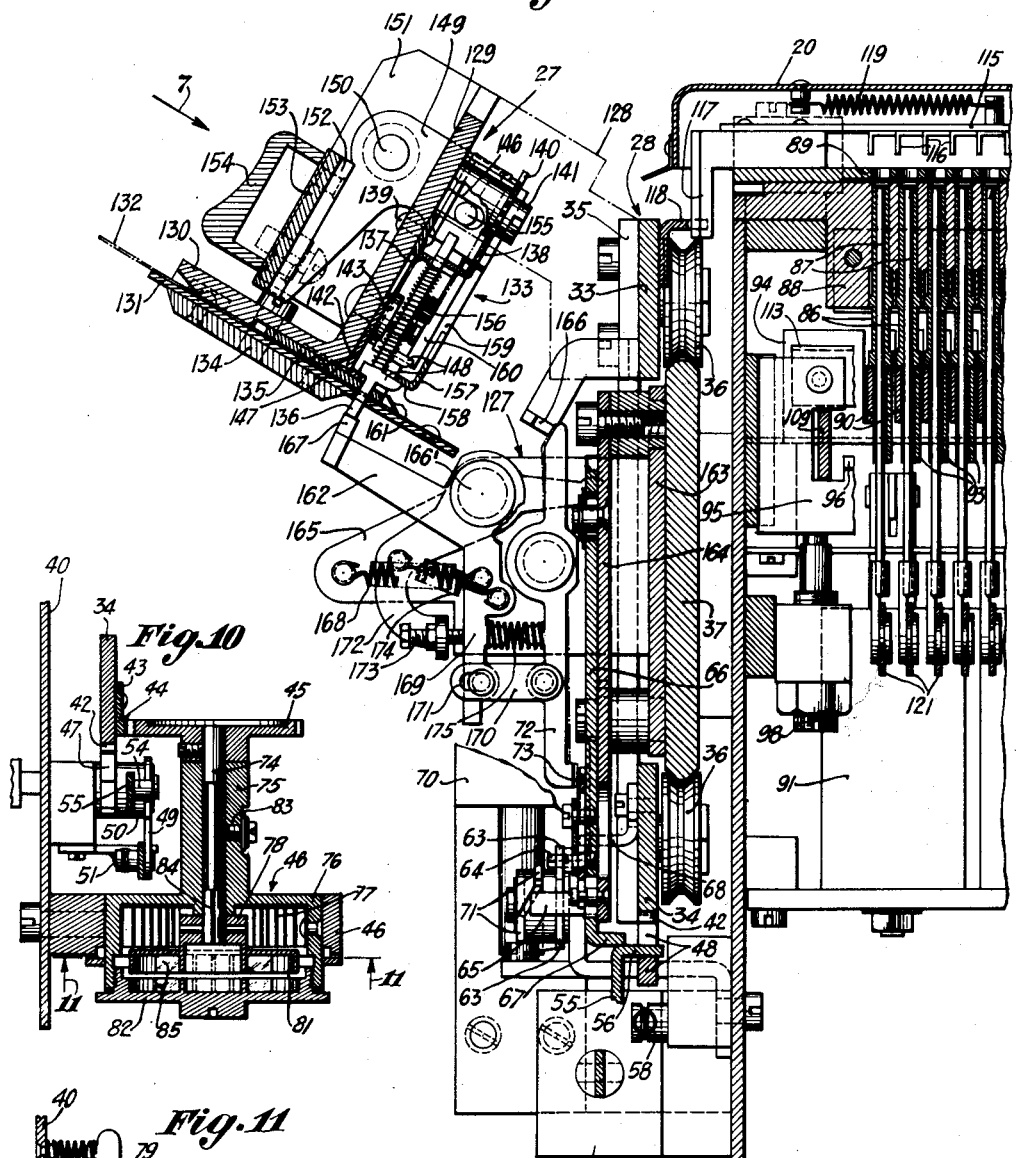
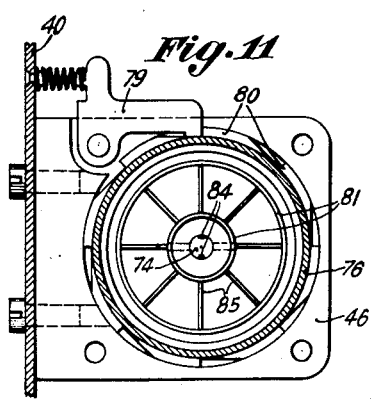
INVENTORS.
*William Wockenfuss and
Clifford C. Leatherman,*
BY
*Edward L. Mueller*
ATTORNEY.

Sept. 29, 1953   C. C. LEATHERMAN ET AL   2,653,665
STATISTICAL CARD PUNCH AND VERIFIER
Filed Jan. 31, 1950   8 Sheets-Sheet 5
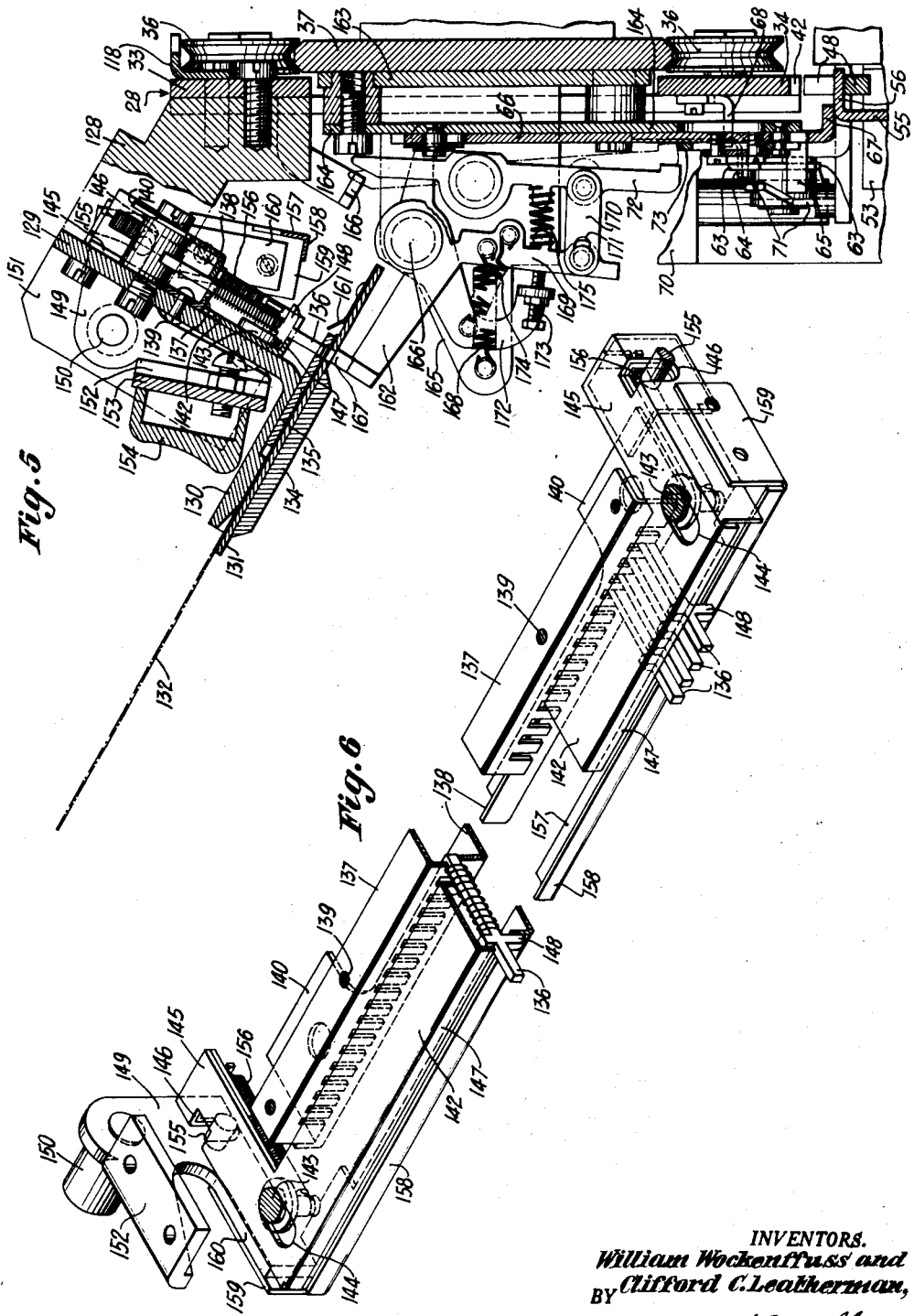
INVENTORS.
William Wockenfuss and
BY Clifford C. Leatherman,
Edward L. Mueller
ATTORNEY.

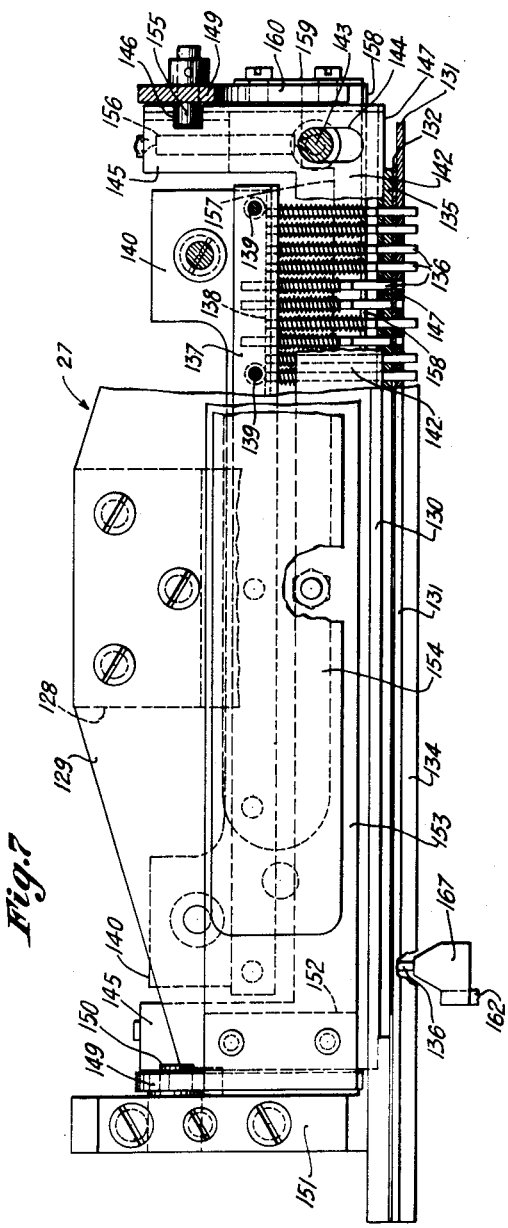

Sept. 29, 1953          C. C. LEATHERMAN ET AL          2,653,665
                   STATISTICAL CARD PUNCH AND VERIFIER
Filed Jan. 31, 1950                                8 Sheets-Sheet 7

INVENTORS.
William Wockenfuss and
Clifford C. Leatherman,
BY
Edward L. Mueller
ATTORNEY.

Sept. 29, 1953   C. C. LEATHERMAN ET AL   2,653,665
STATISTICAL CARD PUNCH AND VERIFIER
Filed Jan. 31, 1950   8 Sheets-Sheet 8

INVENTORS.
William Wockenfuss and
BY Clifford C. Leatherman,

ATTORNEY.

Patented Sept. 29, 1953

2,653,665

UNITED STATES PATENT OFFICE 2,653,665

STATISTICAL CARD PUNCH AND VERIFIER

Clifford C. Leatherman, Flushing, N. Y., and William Wockenfuss, Union, N. J., assignors, by mesne assignments, to Burroughs Adding Machine Company, a corporation of Michigan Application January 31, 1950, Serial No. 141,428

11 Claims. (Cl. 164—117)

This invention relates to improvements in statistical card machines and has particular reference to a skip mechanism for a combined punch and verifier.

Another and more specific feature is to coaxially dispose the punch and verifying elements one within the other in such manner as to enable the operation of the verifying element independently of the punch when verifying a record card.

Card punching machines are known wherein skip bars are utilized to control the movement of the card carriage for the purpose of automatically skipping a number of card columns which may include partial and entire fields of a record card, and the number of columns of a card to be skipped is predetermined by the particular skip bar inserted into the machine. In such machines, so far as known, should it be desired to eliminate punching any one or more columns preceding those which are under the automatic control of the skip bar, two methods are available. First, tab stops must be selectively placed in the machine in a time-consuming operation and when said stops are in position their control of a column skipping operation is invariable until the positions thereof are altered, and this condition eliminates the possibility, should it be so desired, of punching in a column or columns under control of the tab stops unless the latter are removed. In the second method, no tab stops are employed and, in this event, in order to skip columns in which punching operations would be effected under ordinary circumstances, it is necessary to operate the space key of the machine once for each of the columns preceding those that are under automatic control of a skip bar.

In accordance with a feature of this invention, it is proposed to eliminate the use of tab stops entirely and to avoid the necessity of operating the space key a number of times equal to the number of columns in which punching is to be eliminated, by the provision of a skip mechanism including a skip key a single operation of which will produce any desired skipping of more than one column preceding those which are automatically skipped under the control of said mechanism.

Another feature of the invention resides in the use of a master or skip card having perforations therein corresponding to the columns of a record card to be punched, and wherein said master card is inserted into a sensing unit therefor having pins that extend through the perforations in said master card to set up an arrangement of the pins in which spaces will be provided between groups thereof to designate columns of a record card to be skipped so that the presentation of any space to a pin sensing element of the skip mechanism will cause the latter to control the uninterrupted movement of the card carriage until said sensing element encounters another pin, hereupon said carriage will be stopped to permit punching operations to proceed.

The inventive idea involved is capable of receiving a variety of expressions one of which, for purposes of illustration, is shown in the accompanying drawings, but it is to be expressly understood that said drawings are employed merely to facilitate the description of the invention as a whole and not to define the limits thereof, reference being had to the appended claims for this purpose.

In the drawings:

Fig. 2a is an enlarged sectional view of a part of the mechanism shown in Fig. 2 and illustrating the operative position of one of the key operated actuators and some of its associated parts;

Fig. 4 is an enlarged fragmentary vertical transverse section substantially on the line 4—4 of Figs. 3 and 8, illustrating the card carriage in full release position and showing a skip mechanism forming a part of the invention with the parts in the position after a skip card has been placed in said mechanism;

Fig. 5 is a fragmentary sectional view of the skip mechanism, somewhat similar to that of Fig. 4, and illustrating the position assumed by a portion of said mechanism when inserting a skip card in operative position or withdrawing the same from the mechanism;

Fig. 6 is a fragmentary perspective view, partly in section, of the sensing unit forming part of the skip mechanism;

Fig. 7 is a front elevation, partly broken away and shown in section, of the skip mechanism, looking in the direction of the arrow in Fig. 4;

Fig. 9 is a longitudinal sectional view of the escapement mechanism taken on the line 9—9 of Fig. 8;

Fig. 10 is a transverse section on the line 10—10 of Fig. 8, showing the carriage drive and a hydraulic brake mechanism therefor;

Fig. 11 is a transverse section on the line 11—11 of Fig. 10, illustrating a means for adjusting the tension of the drive spring.

Figure 1:
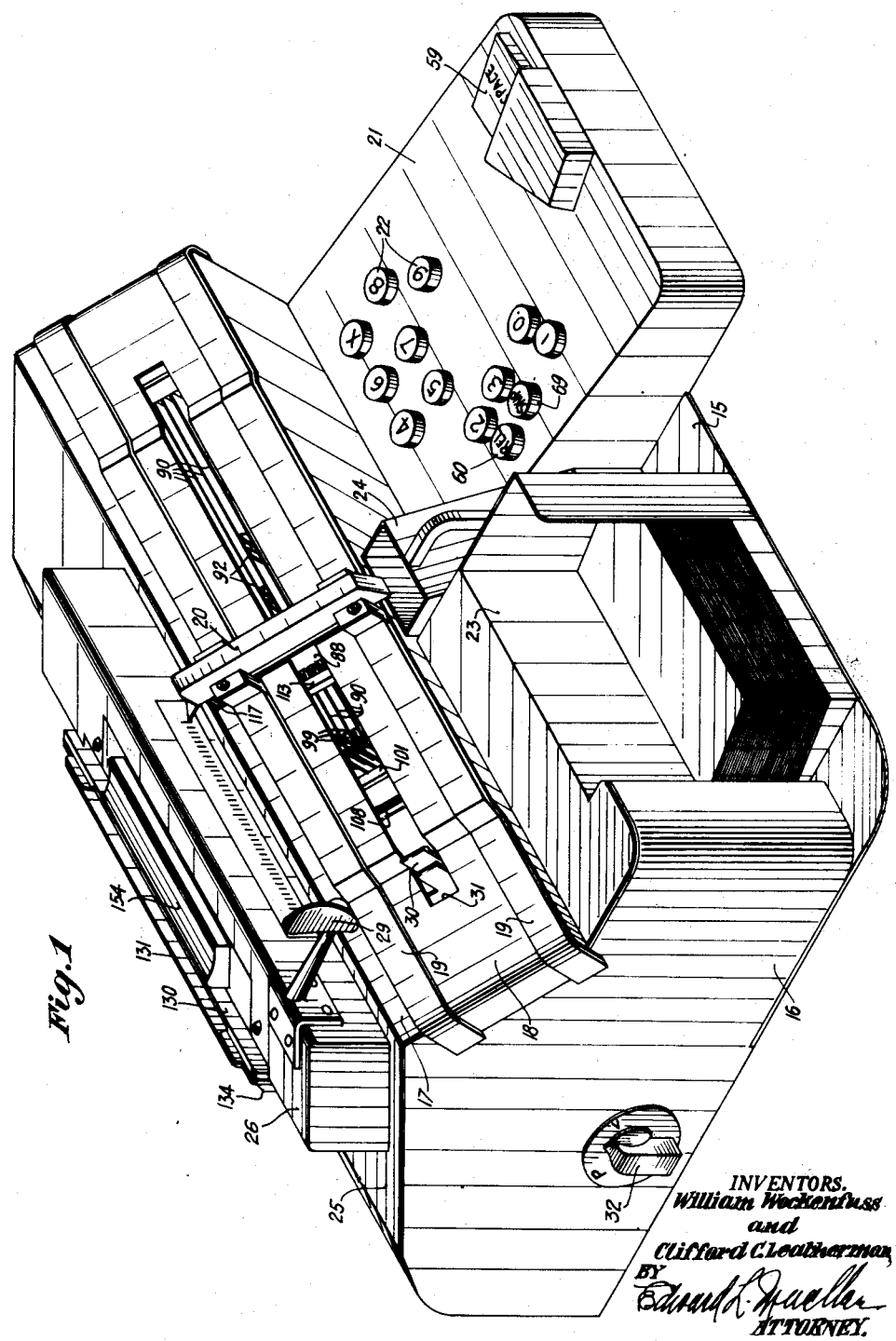
Fig. 1 is a perspective view of a combined punch and verifier constructed in accordance with the invention.

The preferred embodiment of the machine is shown, generally, in Fig. 1 as comprising a base 15 over which the main casing 16 is supported and provided with an intermediate forwardly and downwardly inclined section 17 upon which is mounted the plate 18 having longitudinal guide strips 19 between which a record card is disposed while being punched or verified. Said card, when in position, extends beneath a housing 20 arranged transversely of the plate 18 and located directly above a row of punches and verifying pins which are operated from beneath the card. This arrangement, including the inclination of the section 17, is such that the entire card, with the exception of that portion thereof directly beneath the housing 20, will be clearly visible to the operator during a punching or verifying operation. At the right of the base 15 there is suitably supported an inclined keyboard 21 having a plurality of keys 22 mounted thereon including the digital keys 0 to 9, a control hole key X, and the space, release and skip keys for controlling various operations in the machine. A record card supply magazine 23 is formed from part of the main casing 16 and between said magazine and the keyboard a space is provided for receiving a removable container 24 located directly beneath the lower end of the inclined housing 20 to receive chips which are punched from the cards. Above the rear top section 25 of the casing 16, a housing 26 encloses and is attached to a movable portion of an automatic skip mechanism, generally indicated at 27 (Fig. 4), later to be described in detail, and said movable portion is secured to and actually forms part of the movable card carriage generally indicated at 28. Thus, by means of the finger piece 29 attached to the casing 26, the portion 27 of the skip mechanism and the card carriage may be moved longitudinally to the right from the position shown in Fig. 1 to the starting position wherein the punches and verifying pins under the housing 20 will be in line with the first column of a new record card inserted between the guides 19 and the abutments 30 extending forwardly from the card carriage (Fig. 3) and which project through a slot 31 formed in the plate 18 for engagement with the ends of the card to properly center and retain the same for punching and verifying operations as the carriage is moved along, step by step. A switch 32 mounted on one side of the casing 16 is utilized to cut in the electrical circuits of Fig. 12 when shifting control of the machine from punching to verifying operations, and vice versa.

*Card carriage and its escapement*

The card carriage 28 is composed of the upper and lower longitudinal rails 33 and 34 (Figs. 3, 4 and 8) connected by the transverse end pieces 35, and said rails carry the grooved rollers 36 which engage and roll along the upper and lower beveled edges of the stationary guide plate 37.

The upper rail 33 has secured thereto the forwardly extending arms 38 (Fig. 3) which carry the card abutments 30 and which extend through and are movable in the longitudinal slots 39 formed in a rear plate 40 that supports the guide plate 37 and also cooperates with the parallel front plate 41 to support the punches and verifying pins to be hereinafter described.

A portion of the bottom edge of the lower rail 34 (Fig. 8) is formed with the teeth 42 constituting a part of the carriage escapement, and to the rear face of said rail there is secured a plate 43 provided with a rack 44 engaged by a spur gear 45. Said gear is driven from the spring motor, generally indicated at 46 and shown in detail in Fig. 10, to advance the carriage in accordance with the operation of the various keys of the keyboard, and the advance of the carriage is controlled by the escapement mechanism which includes the two pawls 47 and 48 that alternately engage with the teeth 42 to control such advance. The pawl 47 and the bell crank 49 to which it is fixedly connected are pivotally supported, intermediate their ends, on the stub shaft 50, and a spring 51 attached to one end of the bell crank normally maintains the latter and said pawl in the position shown in Fig. 8. However, when the pawl 47 is either actuated by the punch solenoid 52 (Fig. 2) or the bell crank 49 is rocked by the space solenoid 53 to which it is connected, said pawl will engage with one of the teeth 42. In either event, the rocking of the bell crank 49, one end of which engages a pin 54 on the arm 55, causes the latter to be rocked counterclockwise with the result that its bent end 56 resting on the upper edge of the pawl 48 turns said pawl about its pivot 57 to disengage it from the tooth with which it has been engaged while holding the carriage against advancement. Upon such disengagement, a spring 58 advances said pawl 48, which is loosely mounted on its pivot, a slight distance sufficient for it to engage the next succeeding tooth 42 when the pawl 47 is restored by the de-energization of the punch solenoid and consequent action of the spring 51, thus effecting a single step movement of the carriage.

When spacing, either during punching or verifying operations, the space solenoid 53 is controlled directly from the space key 59 (Figs. 1 and 12) and upon energization of said solenoid, it rocks the bell crank 49 and also the pawl 47 resulting, as previously described, in the advancement of the carriage one step.

A full release of the carriage is accomplished by the operation of release key 60 electrically connected directly to the release solenoid 61 which, when energized, rocks the lever 62 (Figs. 8 and 9) to depress its free end that has the shoulder 63 formed thereon. A spring-biased latch 64 then acts to engage over said shoulder so that said lever 62 will be held in a depressed position until the carriage is fully released. Operation of said lever causes its end adjacent shoulder 63 to engage the extension 65 of an escapement control member in the form of the slide 66 and depress the latter. This slide is a part of the skip control and its lowermost extremity is bent laterally to form a projection 67 that overlies and engages the bent end 56 of the pivoted arm 55 so that when the slide is depressed said arm will be rocked to disengage the pawl 48 from the teeth 42. Under control of the spring motor 46, the carriage now will move uninterruptedly to its full release position. Depression of the slide 66 has other functions in relation to the automatic skip mechanism 27 to be later described. On reaching the full release position of the carriage, a release member 68 (Fig. 8) adjustably secured to said carriage contacts the pivoted latch 64 to disengage it from the shoulder 63, thus permitting lever 62 of the solenoid 61 to restore and also allowing the slide 66 to return to its normally raised position in a manner to appear in the description of the skip mechanism. It is here noted that the skip key 69 on the keyboard is also directly connected electrically to the skip solenoid 70 so that closure of said key will energize said solenoid to rock its arm 71, the free end of which will then engage the extension 65 of the slide 66 to thereby depress the latter. Again, the slide 66 will effect release of the pawl 48 so that the carriage will move freely toward its release position. However, in this skip operation, the carriage will advance only a predetermined distance under control of the skip mechanism 27.

As will more fully appear hereinafter, a single operation of the skip key permits the carriage to move a card uninterruptedly past the punches a distance equal to the width of any number of card columns when it may not be desired to accomplish a punching or verifying operation in said columns which, in the normal operation of the machine, could be effected; and at the termination of said movement the skip mechanism will automatically take over and advance the carriage in a similar manner over one or more complete or partial fields of the card in accordance with a predetermined set-up in said mechanism. In other words, it is possible with the present machine to advance the card more than one column by a single operation of the skip key, and without the use of tab stops, before the automatic skip mechanism assumes control of the carriage, as distinguished from known machines in which tap stops must be employed or the space key must be operated a number of times equal to the number of columns to be skipped before the skip bar of the known machine takes effect. Briefly, the initial skipping operation responsive to the actuation of key 69 and consequent depression of the slide 66, results in the retention of said slide in its depressed position by an operation of said automatic skip mechanism including the latching lever 72 (Figs. 4 and 5) which, because of the depression of said slide, assumes the dotted line position of Fig. 5 wherein it engages the upper end of plate 73 carried by said slide, and thus prevents the return of the latter to its normal position until the lever is restored by the automatic skip mechanism, as will hereinafter appear. Thereupon said mechanism assumes control of the carriage to move it a distance predetermined by the set-up in said mechanism.

*Carriage drive*

As shown in Figs. 10 and 11, the gear 45 which moves the carriage from its starting toward the release position thereof by engagement with the rack 44, is fixed on the rotatable shaft 74 that extends through the sleeve 75 of the stationary housing 76 for the motor 46. A spiral spring 77 has its outer end secured to said housing and its inner end to the head 78 pinned to the inner end of the shaft 74 so that each time the carriage is returned from the release to its starting position the spring 77 will be tensioned to thereafter advance the carriage upon each operation of the escapement mechanism. The housing 76 is held stationary against a counterclockwise movement, as viewed in Fig. 11, by a pawl 79 engaging one of the spaced teeth 80 formed in the outer surface of the housing, and the spring 77 is thus held under tension. The tension of the spring may be regulated by disengaging the pawl 79 from a tooth and then turning the housing clockwise or in an opposite direction depending upon whether the tension is to be increased or decreased, after which said pawl is permitted to again engage with one of the teeth 80.

The motor further comprises a hydraulic braking means which will have the effect of retarding the speed of movement of the card carriage when the escapement mechanism is released. For this purpose, the head 78 carries a braking element 81 in the form of a flanged disc that revolves with said head and cooperates with the stationary closure 82 for the housing 76 to form a space therebetween for receiving oil or other fluid. Said space and the remainder of the housing is filled with a plugged opening 83 in the sleeve 75 and the fluid is allowed to flow in and fill the housing through ducts 84 formed in the shaft 74. Radial blades 85 formed in the rotatable element 81 and the stationary closure 82 then cooperate with the body of oil in which they are immersed to retard the speed of rotation of said element and the shaft 74 to the desired degree.

*The punches and verifying pins and operating mechanism therefor*

The rear and front plates 40, 41 of the machine form a support for the punches 86 and verifying pins 87, the constructions of which are best shown in Fig. 4. A single row of these elements extends transversely between said plates 40, 41 which carry the guide block 88 for said elements. Said punches cooperate with a die plate 89 to perforate a card as it is advanced between said plate and the upper ends of the punches.

According to one of the features of the invention, each punch and its associated verifying pin are co-axially arranged with the pin extending through the punch and having independent or relative movement with respect to the latter during a verifying operation in which the punch remains in its normal or lower position and the pin is raised to either pass through a perforation in the record card being verified or engage the under surface of said card. When a perforation is sensed, the carriage escapement operates to advance the card to the next column to be verified, but if the card is engaged by the pin, the escapement fails to operate and the operator of the machine thereby becomes aware of an incorrect punching.

Each punch element and its verifying pin have associated therewith an actuator bar 90 (Figs. 2 and 2a) which, in both punching and verifying operations, has an initial longitudinal movement imparted thereto by the energization of an individual solenoid 91 under control of one of the keys 22, said movement being effected by a bell crank 92 interconnecting the solenoid plunger with its bar. In a punching operation, this longitudinal movement of the bar 90 is employed to energize the punch solenoid 52, in a manner to later appear, which then controls mechanism to impart upward or secondary movement to said bar to transmit a similar motion to the punch 86 whose lower enlarged end rests upon the upper edge of said bar and that of a guide plate 93 secured to said bar and forming a guide for the verifying pin 87. When punching, the initial longitudinal movement of the bar 90 also results in the elevation of the pin 87 along with its punch but it is obvious that this operation of the pin has no effect since it will pass through the perforation in the record card formed by the punch. When verifying, the initial longitudinal movement of the bar 90 is the only actuation thereof that occurs since, in this instance, the punch solenoid 52 will not be energized, and the only result of said movement of the bar will be to elevate the verifying pin independently and relative to its punch to sense whether or not a perforation has been made in the card being verified at the index point corresponding to the operated key 22.

Figure 2:
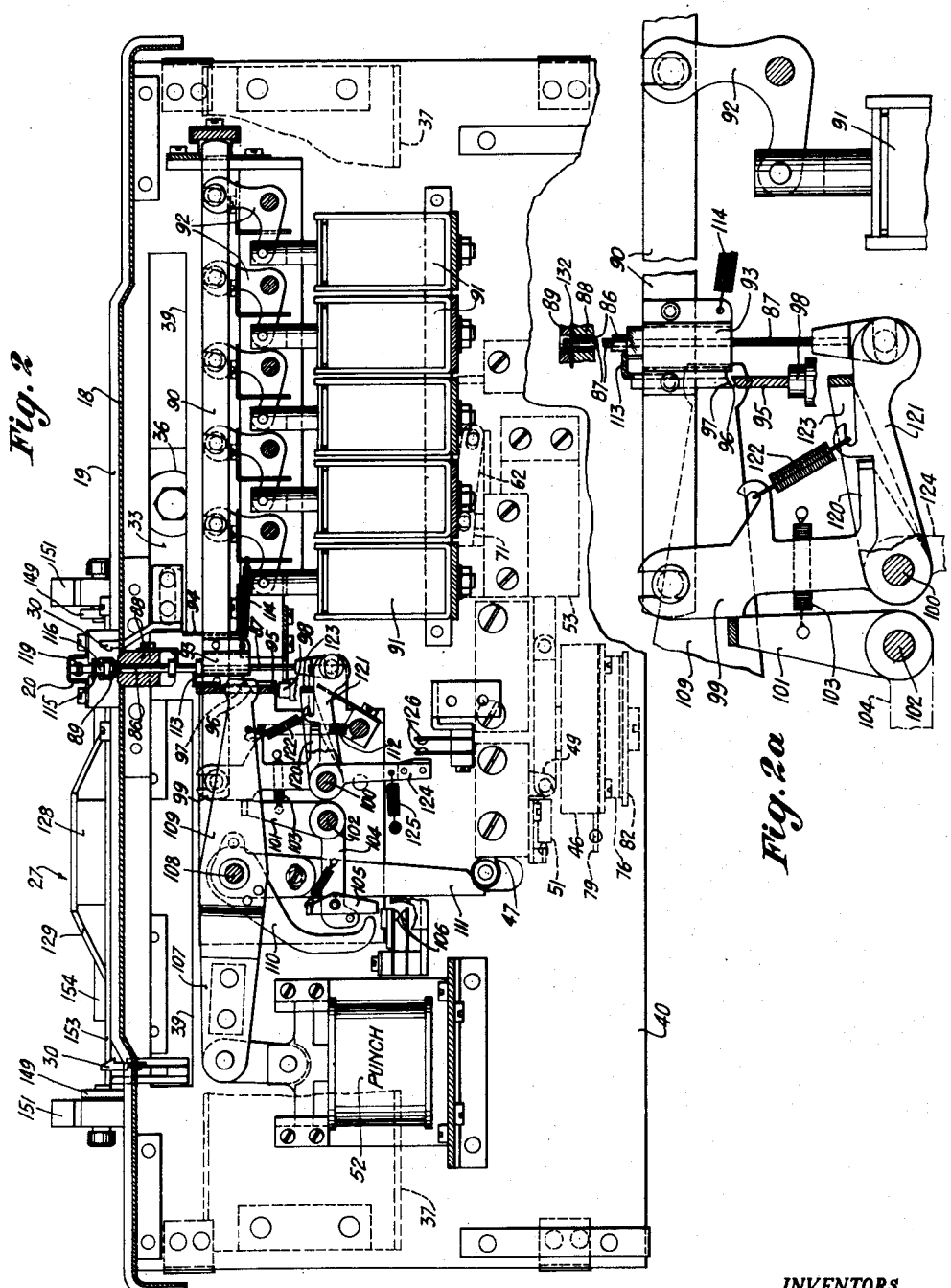
Fig. 2 is a fragmentary longitudinal section taken substantially on the line 2—2 of Fig. 3.
Figure 3:
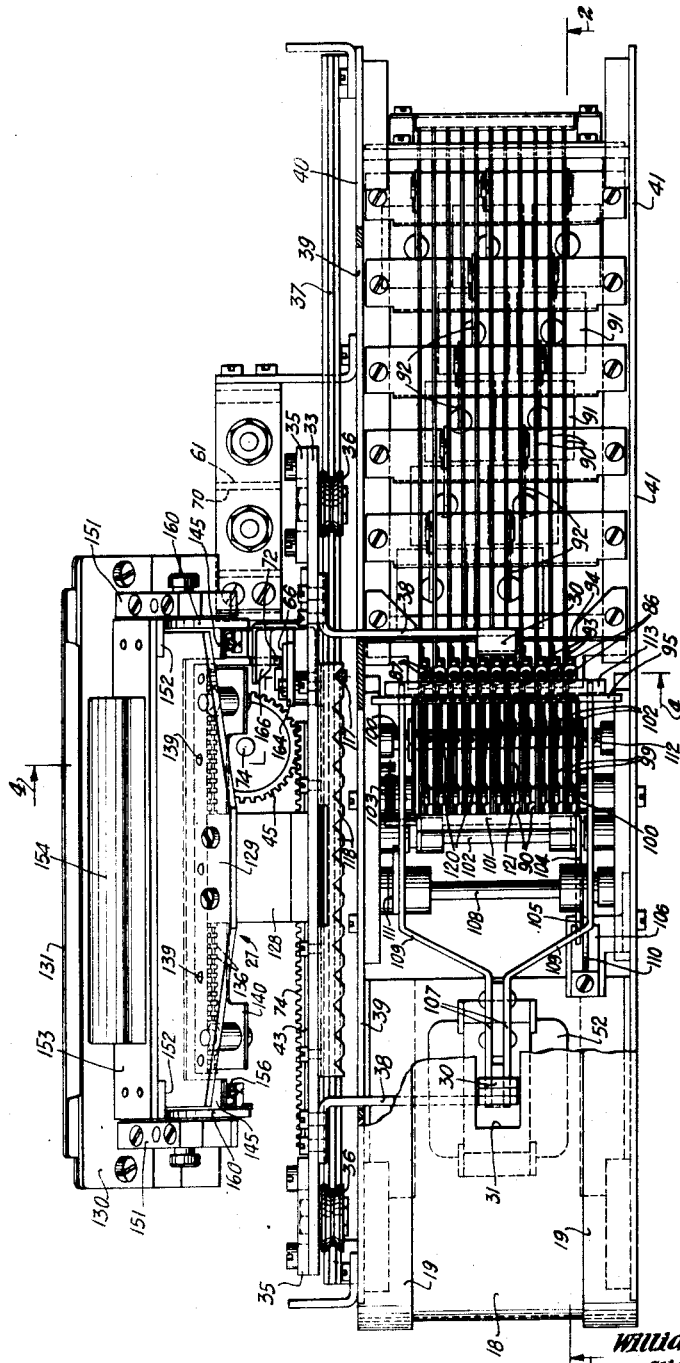
Fig. 3 is a top plan view with the cover of the machine broken away to show the interior construction and illustrating the card carriage in its extreme left hand position from which it is returnable to the starting position thereof.

Returning to the punching operation and by particular reference to Figs. 2, 2a and 3, it will be seen that the actuator bars 90 all extend through a comb 94 (Figs. 2 and 4) located just to the right of the guide plates 93 on said bars. The latter then project through a vertically guided bail plate 95 common to the bars 90 and cut out to receive the same, an edge of said plate being beveled at 96 to cooperate with the beveled edge of a shoulder 97 on each of said guide plates 93 when said bail plate is raised to elevate a punch. Said beveled edges also cooperate, when engaged, to prevent return of an actuator bar 90 upon deenergization of its solenoid 91. In the normal position of Fig. 2, the beveled shoulders 97 on all the guide plates 93 are out of vertical alignment with the edge 96 of said bail plate so that any vertical movement of the latter will have no effect upon a bar 90 and its associated punch 86, but when any one of the bars is advanced longitudinally, to the position of Fig. 2a, by the energization of its solenoid 91 the two mentioned beveled edges will be brought into alignment preparatory to the secondary or upward movement of said bar under the influence of the punch solenoid 52. The amount of movement of the bail plate 95, and consequently of the punches 86, may be regulated by an adjustment of the set screws 98 which engage the lower edge of said plate adjacent its ends, there being only one of such set screws shown in the drawings.

With the switch 32 (Figs. 1 and 12) in the punching position, when one of the keys 22 is struck its associated bar 90 is initially moved longitudinally to the left, as viewed in Fig. 2, to turn the arm 99 loosely mounted on the rock shaft 100 to the position of Fig. 2a. In connection with a verifying operation, this action of the arm 99 results in the elevation of the verifying pin along with its punch, as previously mentioned and more fully described hereinafter. When the arm 99 is rocked, it actuates the common bail 101 on the shaft 102 by contact with the cross piece of said bail and against the tension of its return spring 103. The arm 104 of said bail 101 pivotally carries a spring-biased contact operating member 105 which, when the bail 101 is rocked, closes the punch contacts 106 to establish the operating circuit (Fig. 12) for the punch solenoid 52 which then energizes. Connected to the core of said solenoid is an operating arm 107 secured to the rock shaft 108 and having two branches 109 (see Fig. 3) the extremities of which engage in openings formed in the bail plate 95. When the bar 90 has been fully actuated, shoulder 97 of the guide 93 on said bar is aligned with the beveled edge 96 of the bail plate so that when the arm 107 and shaft 108 are rocked to raise said bail plate it will impart the secondary or upward movement to the bar 90. With the lower end of the punch 86 resting upon the bar and its guide plate 93, as best shown in Fig. 4, the punch will be elevated to form a perforation in the record card. The closure of the contacts 106 for energizing the punch solenoid is only of sufficient duration to permit the solenoid 52 to operate the bail plate 95, whereupon the rocking of the shaft 108 causes a trip arm 110 carried thereby to contact the member 105 and disengage it from the contacts 106 to break the circuit for the punch solenoid. Rocking of the shaft 108 also swings the long arm 111 secured to and depending therefrom so as to cause its lower extremity contacting the adjacent end of the pawl 47 of the escapement mechanism to rock said pawl to engage it with a tooth 42 and thereby initiate the operation of said escapement which results in the advancement of the card carriage, as previously described. After the record card has been perforated by the operated punch 86 and with the solenoid 52 de-energized, the operating arm 107 is restored to normal position by the springs 112 connected to the branches 109 of said arm, only one of said springs being shown in Fig. 2. The return of the arm 107 to normal also restores the bail plate 95 and the arm 111. The bail 95 carries a flange 113 engageable with the enlarged lower ends of all of the punches 86 so as to return any operated punch to its normal position. Since the energized key solenoid 91 is now de-energized by release of the key 22 which has been struck, the associated bar 90 is returned to normal by its individual spring 114 connected to the guide plate 93 of said bar, and the arm 99 is also restored. This latter restoration permits the spring 103 to return the bail 101 to normal and the punching operation is thus completed.

With the punches 86 operating upwardly through the record cards, provision is made for discharging the chips out of said cards from the upper surface of the punch die 89 (Fig. 4). To accomplish this purpose, the housing 20 encloses a reciprocatory agitator 115 having longitudinally spaced blades 116 depending therefrom into proximity with said punch die to agitate and cause the chips above the latter to move downwardly toward the discharge end of the housing 20 where they will be deposited into the receptacle 24. To operate the agitator 115, the same is provided with a depending arm 117 engaged with the teeth of a rack 118 secured to the upper rail 33 of the card carriage so that as the latter moves said rack will force the agitator to the right, whereupon it is returned by the coil spring 119 one end of which is fixed to the housing 20 and the other end to said agitator. This operation of discharging the chips is particularly effective when the card carriage is moved uninterruptedly to its full release position during which the agitator is continuously reciprocated, or when said carriage is returned to its starting position after completion of the punching of a card.

Figure 12:
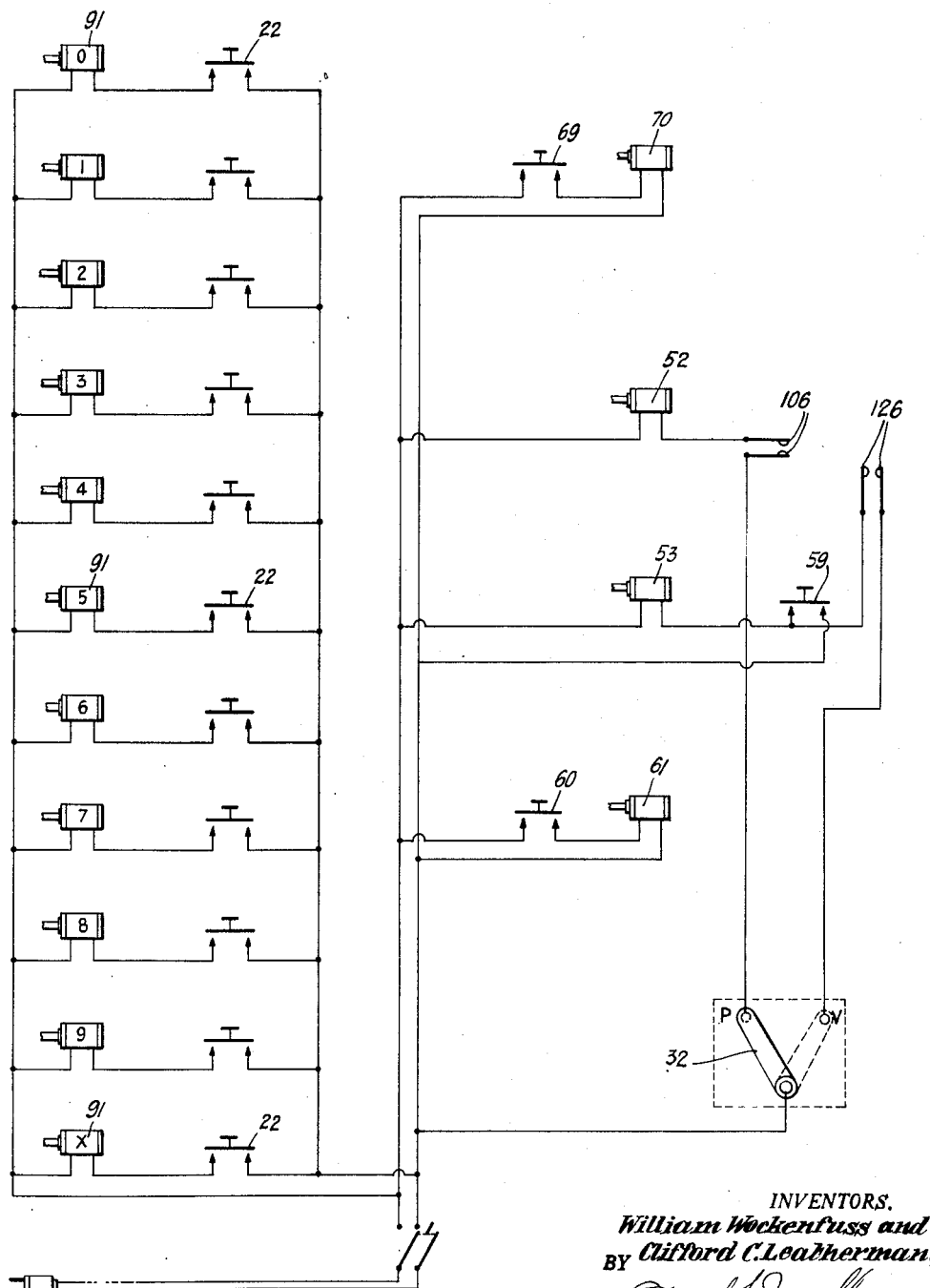
Fig. 12 is a diagrammatic view of the control circuits of the machine.

When verifying a record card which has been punched, the switch 32 is moved to the dotted line position of Fig. 12, thus disconnecting the punch solenoid 52 from the operating circuit. Striking of one of the keys 22 operates the associated actuator bar 90 with the same result as previously described except that closure of the punch contacts 106 has no effect because of the position of the switch 32 and therefore the punch solenoid will not be energized, and with the further result that the bar 90 has only its initial longitudinal movement imparted thereto. Operation of the arm 99 by its bar 90 swings an extension 120 (Fig. 2a) of said arm upwardly to free another arm 121 pivoted on the shaft 100 for upward movement and this latter movement is accomplished by a spring 122 connecting said arm 121 with the arm 99. Said arm 121 is connected to the lower end of the verifying pin 87 which is now raised independently of its associated punch to sense for a perforation in the card being verified. If there is a perforation in the card, the upper end of the pin will pass therethrough and the parts will assume the position of Fig. 2a in which the arm 121 will have elevated a restoring bail 123 common to all said arms. Said bail is secured to the shaft 100 and, by being elevated, will rock the shaft and thus produce a swinging movement of the depending arm 124 also secured to said shaft and this movement, which is against the action of the return spring 125, will be sufficient to close the space contacts 126 for the space solenoid 53 which then energizes. Solenoid 53 now operates the bell crank 49 to initiate the operation of the escapement mechanism as previously described. Should the verifying pin contact a record card instead of passing through a perforation therein, the upward movement of said pin will be stopped, as will be the similar movement of the arm 121 and the restoring bail 123 and, therefore, the swinging movement of the arm 124 will be insufficient to close the space contacts 126 with the result that the escapement mechanism will not be operated to advance the card carriage. Continued movement of the arm 99 after the pin 87 engages a card, will then be against the tension of the spring 122 and the extension 120 of said arm will disengage itself from the arm 121. At the conclusion of the upstroke of the verifying pin, either in the event that it passes through a perforation or contacts a card, the actuator bar 90 restores so as to return the arm 99 to its normal position and re-engage the extension 120 with the arm 121. At the same time, the spring 125 connected to the arm 124 then restores the latter to normal and, in so doing, rocks the shaft 100 to depress the bail 123 to return the arm 121 to its lower position and thereby similarly restore the verifying pin.

Skip mechanism

This mechanism, as will be understood from the above description, controls the automatic and continuous movement of the card carriage 28 together with a record card over a distance equal to the combined width of a plurality of columns of the card, and then stops the carriage in position wherein the next card column to be punched or verified is in alignment with the punches 86 and the pins 87.

Figure 8:
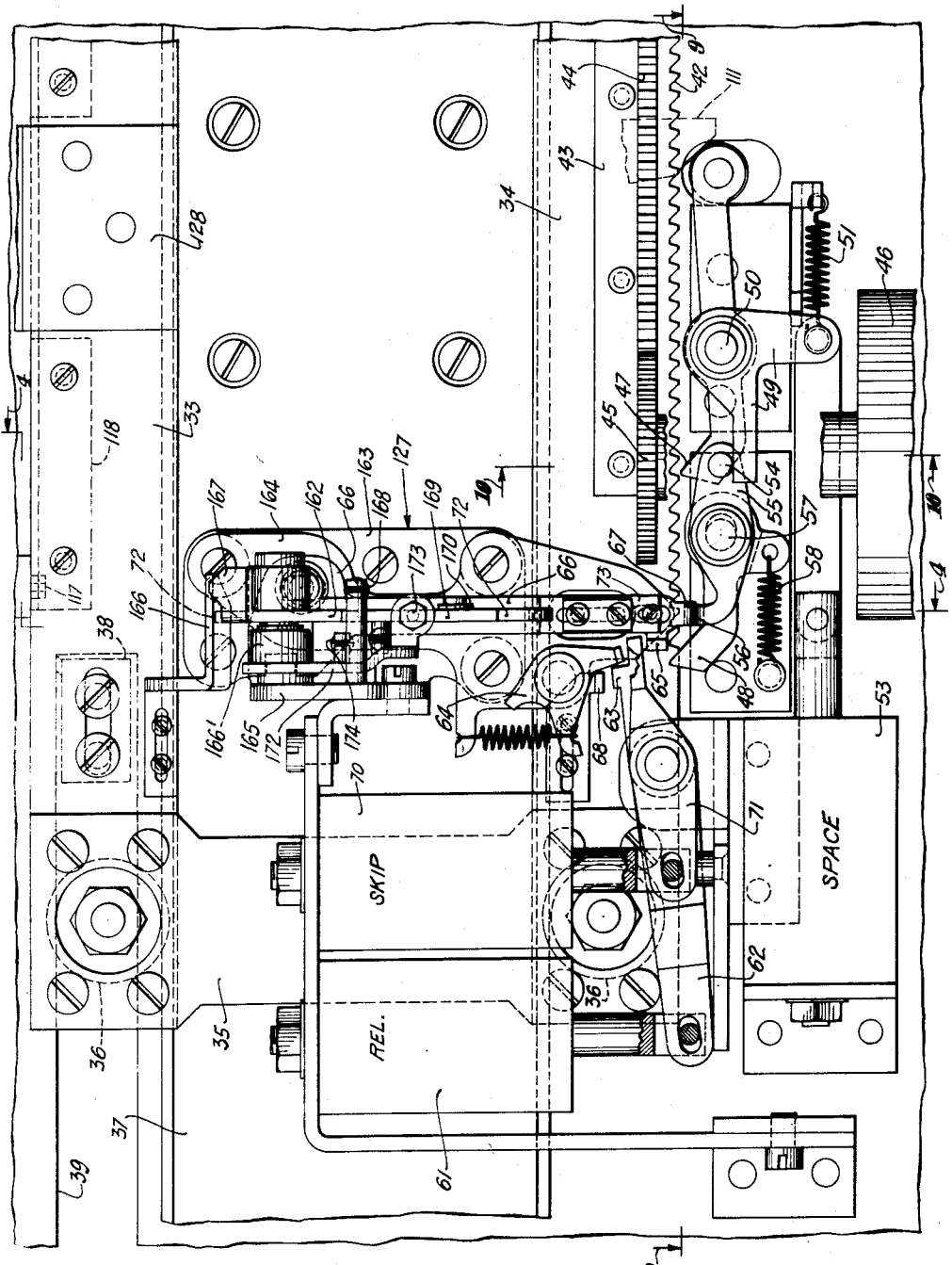
Fig. 8 is an enlarged fragmentary rear elevation of the machine, showing the carriage escapement mechanism and control therefor, and with the carriage in the position of Fig. 3.

The mechanism, broadly, comprises a movable section which has been indicated at 27 and which is supported by the carriage 28, and a stationary section, generally indicated at 127 in Figs. 4, 5 and 8, supported by the guide plate 37 for the card carriage, and of which the slide 66, previously described, forms a part.

The movable section 27, in the main, is enclosed within the housing 26 (Fig. 1) which is not shown in Figs. 4 and 5, and comprises a mounting block 128 bolted to the upper rail 33 of the carriage 28. An angle plate 129 is affixed to the block 128 and its lower portion 130 combines with the card-supporting plate 131 to form a throat for receiving the pre-punched master card 132 indicated in dotted lines, said card being shown in its operative position in Fig. 4, and in the act of insertion or withdrawal in Fig. 5, with elements of the sensing unit, generally indicated at 133, in releasing or inoperative position. Plate 131 is carried by a base member 134, and a guide plate 135 combines with the portion 130 and the plate 131 to form a space for receiving the master card. Said card is provided with a single row of perforations punched therein in predetermined and spaced groups with the perforations representing columns of a card to be punched and the spacing between said groups indicating the distance the punch card will be moved under control of the skip mechanism.

The master card sensing unit 133 is mounted upon the angle plate 129 and comprises a fixed section and a movable section, the latter being movable to the position of Fig. 5 to permit of the insertion of the card 132 into operative position with respect to the sensing unit, whereupon the unit is restored to the position of Fig. 4 in a manner to later appear to allow the advancement of the spring urged sensing pins 136 of the unit into sensing position relative to the card 132. The adjustment of the unit to the position of Fig. 5 also accomplishes the retraction of the pins 136 to the inoperative position shown in said Figure when it is desired to withdraw the master card from the unit and replace it with another differently punched card.

The stationary section of the sensing unit comprises the upper fixed combs 137 and 138 which cooperate to guide the inner or upper ends of the pins 136, said comb 137 being riveted at 139 to the rear face of the angle plate 129, and the comb 138 having enlargements 140 at its ends that are secured at 141 to said plate.

The movable section of said sensing unit consists, basically, of two parts. One is a slidable pin-actuating plate 142 backed against the rear face of plate 129 and guided in its movement relative thereto by studs 143 (see Fig. 6) carried by the latter plate and engaged in slots 144 at the ends of plate 142. Said ends have the lateral flanged extensions 145 in the flange of each of which is formed a slot 146 which is instrumental in raising the plate 142 to the position of Fig. 5, as will more fully appear. The lower longitudinal edge of the actuating plate 142 has a flange 147 which engages under a stop 148 on each of the pins 136, said flange acting, when the plate 142 is raised, to retract said pins to the inoperative position of Fig. 5 where they will be withdrawn from any contact with the master card 132 or from any perforations in said card. Said flange 147 also limits the downward movement to operative position of the pins 136 when the plate 142 is lowered.

The other part of said movable section of the sensing unit comprises a rockable frame having the end pieces 149 provided with trunnions 150 that have a bearing in the block 151 secured to the stationary angle plate 129 to thus form a pivot about which the frame is rocked. The end pieces 149 have flanges 152 connected by a cross bar 153 (Figs. 3, 4 and 5) upon which is secured a finger contact member 154 whereon pressure is exerted by the operator of the machine to rock the frame from the position of Fig. 4 to that of Fig. 5. Studs 155 projecting inwardly from the end pieces 149 engage in the slots 146 in the extensions 145 of the plate 142 and are the instruments by means of which said plate is raised to the position of Fig. 5 when the member 154 is depressed. This sliding movement of the plate 142 is against the tension of the restoring springs 156, each connected at one end to one of the studs 143 and at its other end to the adjacent extension 145 of said plate and acting to restore the latter to the position of Fig. 4 when pressure upon the member 154 is removed. The restoration of the plate 142 under the influence of the springs 156 also accomplishes, through the studs 155, the return of the rockable frame to its position of Fig. 4.

Cooperating with the plate 142 whose flange 147 engages the undersurface of the stops 148 of pins 136, is a flanged pin-locking bar 157 forming part of the movable section of the sensing unit and the flange 158 of which engages the upper surfaces of said stops when the unit is in the position of Fig. 4 to thus prevent any upward movement of said pins during the operation of the machine. Said bar 157 is provided at its ends with lateral flanges 159 secured to the arms 160 of the end pieces 149 so that the bar will rock with the movable frame of the sensing unit to the position of Fig. 5 and thus permit plate 142 and its flange 147 to raise the sensing pins to their inoperative positions.

Assuming the operator is ready for the insertion of a master card 132 into the skip mechanism, the member 154 is depressed to cause the parts to assume the position of Fig. 5 with all the pins 136 retracted. Said card is then placed in position with its inner or lower edge contacting the stop 161 which aligns the row of perforations in the card with the sensing pins 136, whereupon pressure is removed from the member 154 and the springs 156 become effective to slide the plate 142 to the position of Fig. 4, and also restore the rockable frame to said position. During this restoration, the pins 136 are urged downwardly by their springs, and those pins which are aligned with perforations will pass through the same and project to operative position below the plate 131, while the other pins will have their downward movement arrested by the card 132. Upon complete restoration of the rockable frame, the flange of the lock bar 157 engages over the stops 148 of the operative pins and prevents any recession thereof due to upward pressure on their lower extremities. The operative pins now present a pattern which may be best observed in Fig. 7 wherein said pins will be formed in groups with spaces therebetween where other pins were stopped from movement to operative position by contact with the card 132. These spaces between operative groups of pins are indicative of the columns of the record card to be skipped when the skip mechanism becomes effective, which occurs when a sensing member 162 of the stationary section 127, over which member the pins 136 pass with the movable section 27, enters one of said spaces.

The stationary section 127 of the skip mechanism comprises the spaced plates 163 and 164, the former being directly secured to the guide plate 37 and the plate 164 providing the mounting for the slide 66. The plate 163 is formed along one vertical edge thereof with an outstanding bracket 165 which supports, among other elements of the section 127, the latching lever 72 pivoted on said bracket and briefly referred to in connection with the operation of the skip key 69. Before proceeding further with the description of parts, it will be well to bear in mind the different positions of the lever 72, as shown in full and dotted lines in Figs. 4 and 5 under varying conditions of operation. In Fig. 4, the dotted line position alongside plate 73 is the one assumed by said lever during the step-by-step movement of the card carriage 28 as punching or verifying operations proceed from column to column of the record card; and the full line position of said lever is that assumed in the full release position of the card carriage wherein the upper end of said lever engages the trip 166 fixed on the upper rail 33 of said carriage, which trip is utilized to release the slide 66 in the event that a skip operation causes the card carriage to move continuously to said full release position. In Fig. 5, the dotted line position of the lever 72 is assumed as the slide 66 is depressed by the operation of the skip key 69 when a number of columns of a record card are to be skipped instead of punched or verified; and the full line position of said lever is that to which it is moved when the sensing element 162 enters a space between two groups of pins 136 to thereby automatically initiate the operation of the skip mechanism without depression of the skip key 69.

The sensing element 162 turns about a hub 166' and has a tapered head 167 which is constantly urged into engagement with the lower ends of operative pins 136 by a spring 168 connecting the lower arm 169 of said element with the outer reduced extremity of the bracket 165, and the lower end of said arm 169 is joined to the lever 72 by a link 170 and a slotted connection 171 which permits of a limited movement of the element 162 relative to said lever. The tapered head 167 of the sensing element is of sufficient width to straddle the space between adjacent or successive operative pins 136 so that said pins will prevent entrance into the spaces therebetween as the carriage is moved along. Also mounted on the hub 166' is a slide-actuating lever 172 the end of the upper arm of which is engaged in a recess formed in the upper end of the slide 66, while the lower curved extremity of said lever is provided with an adjustable set screw 173 that abuts the arm 169 and is held thereagainst by a spring 174 so that when the element 162, of which said arm forms a part, senses a space formed by inoperative pins 136, the head 167 of said element enters said space under the control of the spring 168. The movement of the element 162 occasioned by the entrance of its head 167 into a space will be transmitted through its arm 169 to the lever 172 to rock the latter and thus depress the slide 66 so that the parts will assume the position of Fig. 5, with the lever 72 in its full line position since, under the condition described, said lever is not required to latch said slide in its depressed position, this being accomplished solely by the lever 172 as long as the sensing head 167 remains in the space between operative pins. Depression of the slide 66 initiates the operation of the carriage escapement mechanism and, with said slide held down by the lever 172, the carriage moves uninterruptedly until the head 167 again engages an operative pin 136 and is forced thereby out of the space, whereupon the parts again assume the position of Fig. 4 with the lever 172 being rocked counterclockwise by the spring 174 connecting it to the arm 169 to thus elevate slide 66 and permit the pawl 48 of the escapement to reengage a tooth 42 and bring the card carriage to a stop.

Let it be assumed that a punching or verifying operation is proceeding in a normal manner and that it is now desired to skip one or more operative pins 136 or, in other words, skip the columns of the record card identified by such pins. From the foregoing, it will be apparent that a single operation of the skip key 69 will cause the solenoid 70 to depress the slide 66 and when this occurs the lever 72, will, under the influence of the spring 175 interposed between said lever and the arm 169, be shifted from the dotted line position of Fig. 4 to that of Fig. 5 where it will engage the upper end of the plate 73 on said slide and thus latch the latter against upward movement. Depression of the said slide also rocks lever 172 clockwise and relative to the arm 169 to move the set screw 173 from abutting relation with said arm. Said shifting of the lever 72 into its latching position is relative to the arm 169 by reason of the link and slot connection 170, 171, and the lever 72 remains in this shifted position with the card carriage now moving continuously until the group of operative pins 136 representing those columns being skipped under control of the skip key pass over the head 167 of the sensing element 162. Said head then enters a space between said pin group and the next succeeding group of operative pins and the action previously described takes places, with the arm 169 moving outwardly to re-engage the set screw 172 before the lever 72 is withdrawn from its latching position to the full line position of Fig. 5 by the link 170, this delayed withdrawal of the lever 72 being due to the slotted connection 171. Thus, the slide 66 will be retained in its depressed position and the card carriage will continue to move uninterruptedly and said slide will remain depressed until the sensing head 167 again engages the first operative pin 136 of a succeeding group whereupon the card carriage will be stopped to present the record card column corresponding to said first pin for a punching or verifying operation.

What is claimed is:

1. In a combined punch and verifier, a movable card carriage and a support therefor, an escapement for said carriage having a release position wherein said carriage is free to move continuously, a skip mechanism comprising a movable section secured to said carriage and a stationary section carried by said support, said movable section comprising a perforated skip card sensing unit and a supporting member therefor, said unit comprising a plurality of pins for sensing perforations in said skip card by projecting through said perforations to form spaced groups of column identifying elements, guide elements for said pins carried by said supporting member, a pin actuating plate movable on said supporting member and operable to retract said pins from sensing position, a movable section for said sensing unit pivoted on said supporting member and having operative connection with said pin actuating plate to operate the same to retract said pins when said section is moved from operative to release position, and further having means to retain such pins in sensing position when said section is in operative position, a slide forming part of the stationary section of said skip mechanism and operable to adjust said escapement to its release position, a sensing element also forming part of the stationary section of said skip mechanism and engageable with those sensing pins which project through perforations in said skip card, means to move said sensing element into a space between adjacent groups of said sensing pins, means actuated by the last named means and connected to said slide for operating the latter, means operable independently of said sensing element and while it is engaged with said sensing pins to also operate said slide, and a latch member then operable to engage and retain said slide in its operated position.

2. In a combined punch and verifier, a movable card carriage, an escapement therefor having a release position, a control member for said escapement adjustable to and from a position in which it releases said escapement, a skip mechanism comprising a stationary section and a movable section, the latter being secured to said carriage and including a plurality of pins having operative and inoperative positions, a perforated skip card whose perforations are penetrated by certain of said pins for movement to operative position while the remaining pins are maintained in inoperative position by engagement with said card to form a pattern of spaced groups of operative pins, a sensing element carried by said stationary section for movement into a space between adjacent groups of said pins, an element movably carried by said stationary section for sensing said pins, said element being movable into a space between adjacent groups of pins and being also movable out of said space by contact with a pin of one of said groups, and an operative connection between said sensing element and said control member for adjusting the latter when said element moves into and out of said space.

3. In a combined punch and verifier, a movable carriage, an escapement therefor having a release position, a skip mechanism comprising stationary and movable sections the latter of which is supported on said carriage, a perforated skip card insertable into said movable section, sensing pins in said movable section certain of which are movable to operative positions through the perforations in said skip card which obstructs said movement by others of said pins whereby to form a pattern of spaced groups of operative pins, a sensing element pivoted on said stationary section of said skip mechanism for engagement with said operative pins and for movement into and out of the spaces between groups thereof, a slide mounted on said stationary section and operatively connected to said escapement for adjusting the same to release position, and means controlled by said sensing element when it moves into one of said spaces for adjusting said slide.

4. A combined punch and verifier in accordance with claim 3, wherein said sensing element thereafter, and upon further movement of said carriage, contacts an operative pin and is moved thereby out of said space, and means thereupon operable to restore the last named means and said slide.

5. In a combined punch and verifier, a carriage for moving a record card column by column to punching or verifying position, an escapement for said carriage controlling its movement and having a release position, a control member operable to adjust said escapement to said position, a skip card sensing unit movable with said carriage and including a plurality of spring urged sensing pins one for each column of said record card and having operative and inoperative positions, a skip card mounted in said unit for engagement by said pins to prevent certain of them from assuming an operative position and having perforations through which others of said pins extend to operative position to form a pattern of spaced groups of operative pins, means to sense a space between adjacent groups of pins, and means actuated by said sensing pins upon sensing said space for operating said control member.

6. A combined punch and verifier according to claim 5, a skip key, means controlled by said key for operating said control member, means to latch said control member in operative position when actuated by said controlled means, and means controlled by said sensing means when it senses said space to render said latching means ineffective.

7. In a combined punch and verifier, a carriage for moving a record card column by column to punching or verifying position, a carriage escapement and a control member therefor, a skip key, means responsive to a single operation of said key to operate said control member to release said escapement for a time sufficient for the carriage to uninterruptedly move a plurality of card columns past said punching or verifying position, means to retain said control member operative while the carriage is moving, means other than said responsive means to which operation of said control member is transferred from said retaining means, and means to render said other means effective after said carriage has been so moved.

8. In a combined punch and verifier, a card carriage movable step by step during punching or verifying operations, an escapement for said carriage having a release position in which the same will have continuous movement, a skip mechanism movable with said carriage and comprising a plurality of sensing pins having operative and inoperative positions, means in association with said pins and sensed thereby to form a pattern consisting of spaced groups of operative pins, a sensing element contacting said operative pins during the step by step movement of said carriage and movable into a space between groups thereof, means to adjust said escapement to its release position, a skip key, means controlled by a single operation of said key while said sensing element is contacting said pins to operate said escapement adjusting means, and means thereafter operated by said sensing element upon entry thereof into said space to maintain said adjusting means in its operated position without interruption in the continuous movement of said carriage produced by the operation of said skip key.

9. In a combined punch and verifier, a carriage for moving a record card column by column to punching or verifying position, an escapement controlling the movement of said carriage and having a release position in which said carriage moves continuously, a control member operable to adjust said escapement to release position, means to retain said member in operative position, a skip key, means responsive to a single operation of said key to render operative said escapement control member and its retaining means to thereby retain said escapement in its release position while the carriage is continuously moving columns of said record card past said punching or verifying position, and a skip mechanism operable upon passage of the last of said columns beyond said punching or verifying position to continue, without interruption, the release position of said escapement for a predetermined interval, said skip mechanism including an operating element for said control member to which control of the latter member is transferred from said retaining means.

10. In a combined punch and verifier, a movable card carriage, an escapement therefor having a release position, a perforated skip card sensing unit comprising a plurality of pins movable through perforations in a skip card to form spaced groups, a supporting member for said unit, guide elements for said pins carried by said supporting member, a pin actuating plate movable on said supporting member and operable to retract said pins from their group forming position, a movable section for said sensing unit pivoted on said supporting member and having operative connection with said pin actuating plate to operate the same to retract said pins when said section is moved to one position, and further having means to retain said pins in group forming position when said section is moved to another position, a sensing element for said pins movable into a space between adjacent groups thereof as said carriage is moved, and means operated by said sensing element when it moves into said space for releasing said escapement.

11. In a combined punch and verifier, a movable card carriage, an escapement therefor having a release position, a skip card sensing unit mounted on said carriage and comprising a supporting member and a movable section carried thereby, a plurality of pins having operative positions to which they are movable through perforations in a skip card to form spaced groups, means on said movable section operable when the latter is in one position to retain said pins in operative position and movable with said section to release said pins, pin retracting means operatively connected to said movable section for withdrawing said pins from their operative position when said section is moved to another position, means to sense a space between adjacent groups of operative pins, and means controlled by said sensing means to release said escapement.

CLIFFORD C. LEATHERMAN.
WILLIAM WOCKENFUSS.

References Cited in the file of this patent

UNITED STATES PATENTS

| Number | Name | Date |
|---|---|---|
| 1,300,491 | Schaaf | Apr. 15, 1919 |
| 1,668,011 | Friedmann | May 1, 1928 |
| 1,921,408 | Gutgesell | Aug. 8, 1933 |
| 1,925,623 | Bernard et al. | Sept. 5, 1933 |
| 1,962,750 | Read | June 12, 1934 |
| 1,989,844 | Bryce | Feb. 5, 1935 |
| 2,046,082 | Mills | June 30, 1936 |
| 2,217,209 | Von Pein et al. | Oct. 8, 1940 |
| 2,365,189 | Grady | Dec. 19, 1944 |